No. 635,734. Patented Oct. 31, 1899.
G. F. ANDERSON.
SEPARATOR.
(Application filed Jan. 16, 1899.)
(No Model.)
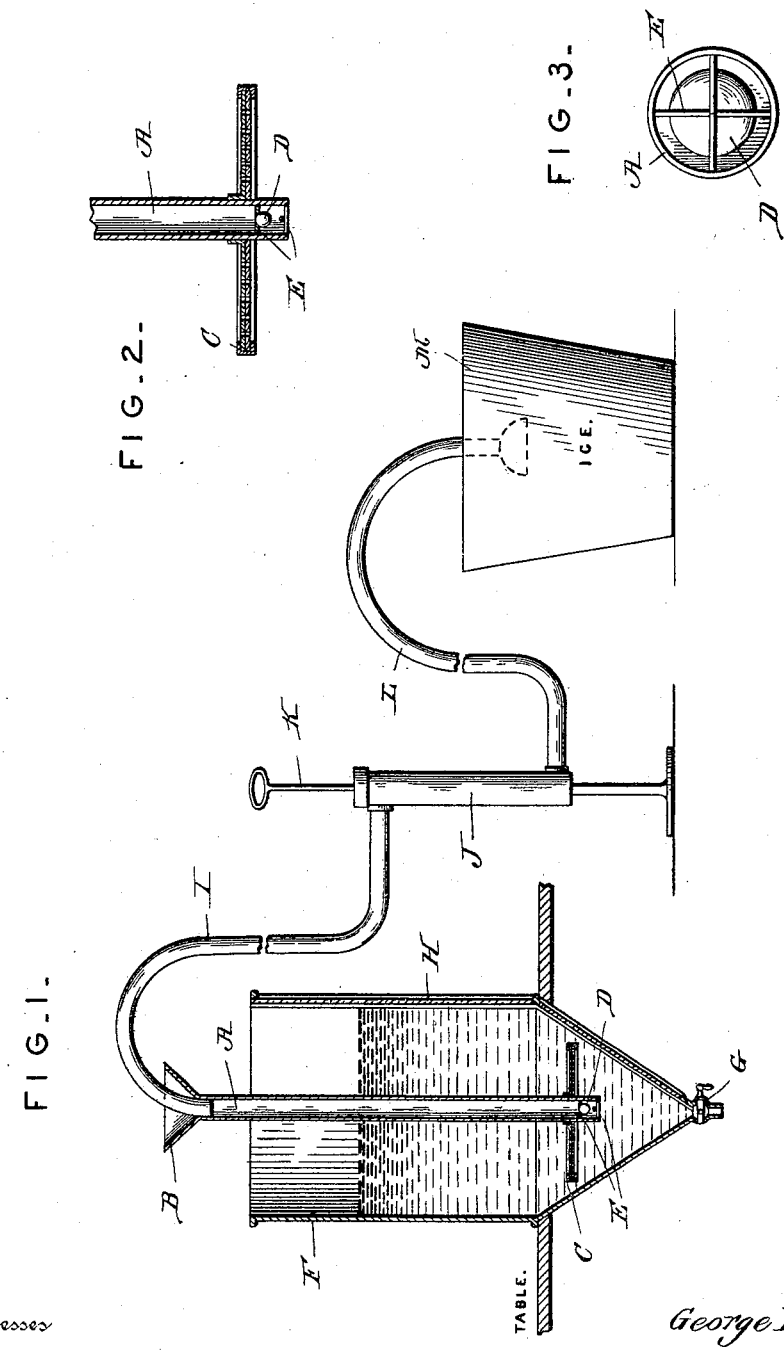
Witnesses
Harry L. Ames
A. H. Bond
Inventor
George F. Anderson.
by E. H. Bond
Attorney
THE NORRIS PETERS CO., PHOTO-LITHO., WASHINGTON, D. C.

UNITED STATES PATENT OFFICE.

GEORGE F. ANDERSON, OF MARSHALLTOWN, IOWA.

SEPARATOR.

SPECIFICATION forming part of Letters Patent No. 635,734, dated October 31, 1899.

Application filed January 16, 1899. Serial No. 702,281. (No model.)

*To all whom it may concern:*

Be it known that I, GEORGE F. ANDERSON, a citizen of the United States, residing at Marshalltown, in the county of Marshall and State of Iowa, have invented certain new and useful Improvements in Separators; and I do hereby declare the following to be a full, clear, and exact description of the invention, such as will enable others skilled in the art to which it appertains to make and use the same.

This invention relates to certain new and useful improvements in devices for separating fats from liquids—such, for instance, as for household use, or a cream or milk separator.

The present invention resides in the peculiar construction and the combination of parts, as hereinafter more fully described, shown in the drawings, and then particularly pointed out in the claim.

The invention is clearly illustrated in the accompanying drawings, which, with the letters of reference marked thereon, form a part of this specification, and in which—

Figure 1 is a view, partly in section, showing my improved separator designed for use in connection with a force-pump. Fig. 2 is a sectional detail of the base portion. Fig. 3 is an enlarged detail of the lower end of the tube, the same being a bottom plan.

Like letters of reference indicate like parts throughout the several views.

Referring now to the details of the drawings by letter, A designates a tube, of any desired size and material, formed or provided at its upper end with a funnel B. Within this tube is a valve, preferably a float-valve D, which is designed to work between suitable stops E within the tube, so that while it may have all the movement required it cannot become displaced from the tube.

C is the base portion. It is composed of two disks, perforated as shown, one being fast to the tube and the other loose thereon, so that the perforations may be brought so that those of the one disk will not be coincident with those of the other, and thus form a cut-off when one disk is turned.

F is the vessel within which the tube is designed to be used. In this instance it is shown as having its bottom portion funnel-shaped, and at its lower end is provided with a cock or faucet G of any well-known form. This vessel may be provided with a base, or it may be placed on a bench or table with a hole and of suitable height for convenience in removing the separated product.

H is a strip of transparent material fixed in the wall of the vessel in any suitable manner, so as to be made water-tight, and this transparent portion permits of the liquid being inspected during the process of separation and also while being drawn off.

The air may be forced into the funnel-mouth of the tube in any suitable manner. In Fig. 1 I have shown how a force-pump may be used for this purpose; but it will be understood that I do not intend to limit myself to any particular means for this purpose. Neither do I wish to be limited to the style of vessel, as others than that herein illustrated may be employed in connection with the tube and its perforated base portion and valve. The tube can be used in any convenient kind of vessel in which the fat has been placed.

In use cold water is poured in at the top of the tube, filling the tube and forcing down the air that is in the tube, the valve or float preventing the milk or fat substance from rising up in the tube. The air that is forced down through the tube passes through the perforations in the base portion and rises through the liquid, separating the fatty globules and carrying them or causing them to rise to the top. When the fat has all been separated and risen to the top, the milk or liquid may be drawn off at the bottom through the faucet. After the milk or water has been drawn off the fat follows down, the vessels are changed, and then the fat may be drawn off, or skimmed off, or lifted out, as may be found most expedient.

The shape of the pan may be varied in accordance with the shape of the bottom of the vessel with which it is to be used. The pan may be used either side up.

As indicated in Fig. 1, the pump J may be provided with a tube I, arranged to discharge into the funnel-mouth B of the tube, and the tube L taking water from the receptacle M, in which may be placed ice or cold water, the plunger being actuated by the stem K to suck water from the receptacle M and force it into the tube A, as will be readily understood.

Other forms of pump or a bellows may be substituted for the pump herein shown.

What is claimed as new is—

The combination with a vessel, of a tube removably inserted therein and provided with a double-disk base portion with perforations one of said disks being stationary and the other movable with relation thereto whereby the fat may be cut off and still leave a free passage for the water or milk, as set forth.

In testimony whereof I affix my signature in presence of two witnesses.

GEORGE F. ANDERSON.

Witnesses:
   J. L. HOLE,
   GEO. J. ALLEN.